US008051655B2

(12) United States Patent
Silver et al.

(10) Patent No.: US 8,051,655 B2
(45) Date of Patent: *Nov. 8, 2011

(54) METHOD AND SYSTEM FOR ELECTRICAL AND MECHANICAL POWER GENERATION USING STIRLING ENGINE PRINCIPLES

(76) Inventors: Guy Silver, Sunnyvale, CA (US); Juinerong Wu, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/963,274

(22) Filed: Oct. 12, 2004

(65) Prior Publication Data

US 2006/0075752 A1    Apr. 13, 2006

(51) Int. Cl.
*F01B 29/08* (2006.01)
*F01K 25/02* (2006.01)
(52) U.S. Cl. .................. 60/516; 60/643; 60/645; 60/650
(58) Field of Classification Search .................... 60/508, 60/517–526, 643–684; 62/6; 290/52
See application file for complete search history.

(56) References Cited

U.S. PATENT DOCUMENTS

| | | | |
|---|---|---|---|
| 2,453,373 A | 11/1948 | Kollsman | |
| 2,453,374 A | 11/1948 | Kollsman | |
| 2,453,375 A | 11/1948 | Kollsman | |
| 2,490,064 A | 12/1949 | Kollsman | |
| 2,490,065 A | 12/1949 | Kollsman | |
| 2,490,066 A | 12/1949 | Kollsman | |
| 2,490,067 A | 12/1949 | Kollsman | |
| 2,514,874 A | 7/1950 | Kollsman | |
| 2,514,875 A | 7/1950 | Kollsman | |
| 2,520,729 A | 8/1950 | Kollsman | |
| 2,569,996 A | 10/1951 | Kollsman | |
| 2,569,997 A | 10/1951 | Kollsman | |
| 2,597,249 A | 5/1952 | Kollsman | |

(Continued)

FOREIGN PATENT DOCUMENTS

JP            57052608 A   *   3/1982

(Continued)

OTHER PUBLICATIONS

Patent Abstract, JP 357052608, Publication date Mar. 29, 1982, 1 page.

(Continued)

*Primary Examiner* — Hoang Nguyen
(74) *Attorney, Agent, or Firm* — Haynes and Boone, LLP

(57) ABSTRACT

A heat engine enclosed in a housing has two chambers maintained at different temperatures. The first chamber ("hot chamber") receives heat energy from an external power source. The second chamber ("cold chamber") is connected to the hot chamber by two conduits, such that a fluid (e.g., air, water, or any other gas or liquid) filling the two chambers can circulate between the two chambers. The expansion of the fluid in the hot chamber and the compression of the fluid in the cold chamber drive a turbine to provide a power output. The fluid may be pressurized to enhance efficiency. In one embodiment, the turbine propels an axle in a rotational motion to transmit the power output of the heat engine to an electrical generator outside of the heat engine's housing. In one embodiment, the turbine includes a first set of blades and a second set of blades located in the hot chamber and the cold chamber, respectively. The blades may each have a flat profile having two unequal surfaces, such that the turbine rotates in preferentially in one direction.

118 Claims, 4 Drawing Sheets

U.S. PATENT DOCUMENTS

| | | | |
|---|---|---|---|
| 3,748,057 A | 7/1973 | Eskeli | |
| 3,791,167 A | 2/1974 | Eskeli | |
| 3,793,848 A | 2/1974 | Eskeli | |
| 3,795,461 A | 3/1974 | Eskeli | |
| 3,809,017 A | 5/1974 | Eskeli | |
| 3,815,362 A * | 6/1974 | Kolbinger | 60/525 |
| 3,834,179 A | 9/1974 | Eskeli | |
| 3,861,147 A | 1/1975 | Eskeli | |
| 3,931,713 A * | 1/1976 | Eskeli | 60/650 |
| 3,949,557 A * | 4/1976 | Eskeli | 60/682 |
| 3,986,359 A | 10/1976 | Manning et al. | |
| 4,055,960 A * | 11/1977 | St. Clair | 62/6 |
| 4,057,965 A * | 11/1977 | Eskeli | 60/650 |
| 4,107,944 A | 8/1978 | Eskeli | |
| 4,130,993 A | 12/1978 | Erazo | |
| 4,142,088 A * | 2/1979 | Hirsch | 219/121.6 |
| 4,269,031 A | 5/1981 | Loskot | |
| 4,468,176 A | 8/1984 | Munch | |
| 4,488,524 A | 12/1984 | Sugiura | |
| 4,629,031 A | 12/1986 | Kato et al. | |
| 5,224,842 A | 7/1993 | Dziorny et al. | |
| 5,537,823 A * | 7/1996 | Vogel | 60/682 |
| 5,751,069 A | 5/1998 | Rajashekara | |
| 5,813,235 A * | 9/1998 | Peterson | 62/6 |
| 6,196,047 B1 | 3/2001 | Carnegie et al. | |
| 6,752,595 B2 | 6/2004 | Murakam | |
| 6,996,983 B2 | 2/2006 | Cameron | |
| 7,320,218 B2 | 1/2008 | Silver et al. | |
| 2006/0010871 A1 * | 1/2006 | Frechette et al. | 60/670 |

FOREIGN PATENT DOCUMENTS

| | | | |
|---|---|---|---|
| JP | 357052608 A | 3/1982 | |

OTHER PUBLICATIONS

Office Action dated Mar. 3, 2010 in U.S. Appl. No. 11/577,163, 11 pages.

* cited by examiner

US 8,051,655 B2

METHOD AND SYSTEM FOR ELECTRICAL AND MECHANICAL POWER GENERATION USING STIRLING ENGINE PRINCIPLES

BACKGROUND OF THE INVENTION

1. Field of the Invention

The present invention relates to applying Stirling engine principles to the design and use for power conversion equipment. In particular, the present invention relates to applying Stirling engine principles for electrical and mechanical power generation, especially in the direct current (DC) mode or in the alternating current (AC) modes.

2. Discussion of the Related Art

The Stirling engine is a heat engine that operates by converting the heat energy which flows between two portions of the heat engine having different temperatures into mechanical power. A typical Stirling engine uses the heat energy to drive a coordinated and reciprocating motion of a set of pistons. Numerous designs of Stirling engines can be found in the prior art, including: U.S. Pat. Nos. 6,578,359, 6,050,092, 6,195,992, 6,735,946 and 6,164,263. The designs of these Stirling engine are typically complex and include numerous moving parts. Consequently, these designs are costly to manufacture and their efficiencies are low.

SUMMARY

The present invention provides a heat engine enclosed in a housing having two zones maintained at different temperatures. The first zone ("hot zone") receives heat energy from an external power source. The second zone ("cold zone") is connected to the hot zone, such that a fluid (e.g., air, water, or any other gas or liquid) filling the two zones can circulate between the two zones. The expansion of the fluid in the hot zone and the compression of the fluid in the cold zone provide a symmetrical thermodynamic cycle to drive a turbine to provide a power output. The fluid may be pressurized to enhance efficiency.

In one embodiment, the turbine propels an axle in a rotational motion to transmit the mechanical power output of the heat engine. In one embodiment, the turbine propels an axle in a rotational motion to transmit the power output of the heat engine to an electrical generator outside of the heat engine's housing. In one embodiment, the turbine includes a first set of blades attached to a plate located in the hot zone and a second set of blades attached to a plate located in the cold zone. The blades may each have a flat profile having two unequal surfaces, such that the turbine rotates in preferentially in one direction. In one embodiment, the electrical generator includes one or more magnets in rotational motion according to the rotational motion of the axle, and one or more conductive coils coupled to the magnetic fields of the one or more magnets. The amount of coupling between the magnets and the coils may be controlled by a step motor moving the coils into different positions relative to the magnets. In one embodiment, the electrical generator delivers AC power. Alternatively, DC power may be provided by either rectifying the AC power, or by selectively coupling those coils that have an instantaneous positive voltage relative to a ground terminal. To synchronize the coil selection, a position sensor may be provided to sense the positions of the magnets. In one embodiment, the position sensor includes a light sensitive sensor, a light emitting diode and a light reflector.

According to one embodiment of the present invention, a temperature sensor may be used to control the power output of the heat engine. A signal output of the temperature sensor indicates a temperature difference between the hot and cold chambers. Based on this output signal of the temperature sensor, a control circuit adjusts the coupling between the magnets and the coils in the electrical generator. In an AC power generation application, a control circuit senses to the frequency of the electrical generator's output power to control the output power of the electrical generator.

In one embodiment, adding power output is achieved using thermal couples and thermionic devices. The thermal couple takes advantage of the temperature difference between the hot and cold chambers. The thermionic devices extract heat from the housing of the heat engine. These devices may be stored in an insulated chamber between two plates separating the hot and cold zones.

The present invention provides a heat engine in which the gas or fluid transferring heat between the hot and cold zones is used to drive the turbine, resulting in low power loss in the energy conversion process. In addition, the housing provides air flow between the hot zone and the cold zone through a center shaft and a peripheral space so as to allow 100% component use with no dead time. The cylindrical symmetry of the heat engine provides stability with minimum vibration and an absence of drag during operation. The heat engine of the present invention has a simple design with few moving parts, without the requirements of a displacer, a piston or a regenerator. Thus, the heat engine of the present invention is light weight, low component cost and easy to maintain.

A heat engine of the present invention may be used to power an automobile or another vehicle. It can also be incorporated, for example, in any application in which a source of heat energy is provided (e.g., fuel cells or energy recovery from combustion of waste).

In addition, the control system of the present invention provides a consistent output power to enhance fuel efficiency.

The present invention is better understood upon consideration of the detailed description below and the accompanying drawings.

DETAILED DESCRIPTION OF THE PREFERRED EMBODIMENTS

The present invention provides a heat engine, operating under Stirling engine principles, for converting heat energy into mechanical and electrical energy. The electrical energy derived using a heat engine of the present invention may be in the form of alternating current (AC) power, for immediate distribution, or in the form of direct current (DC) to allow storage or other applications.

Figure 1:
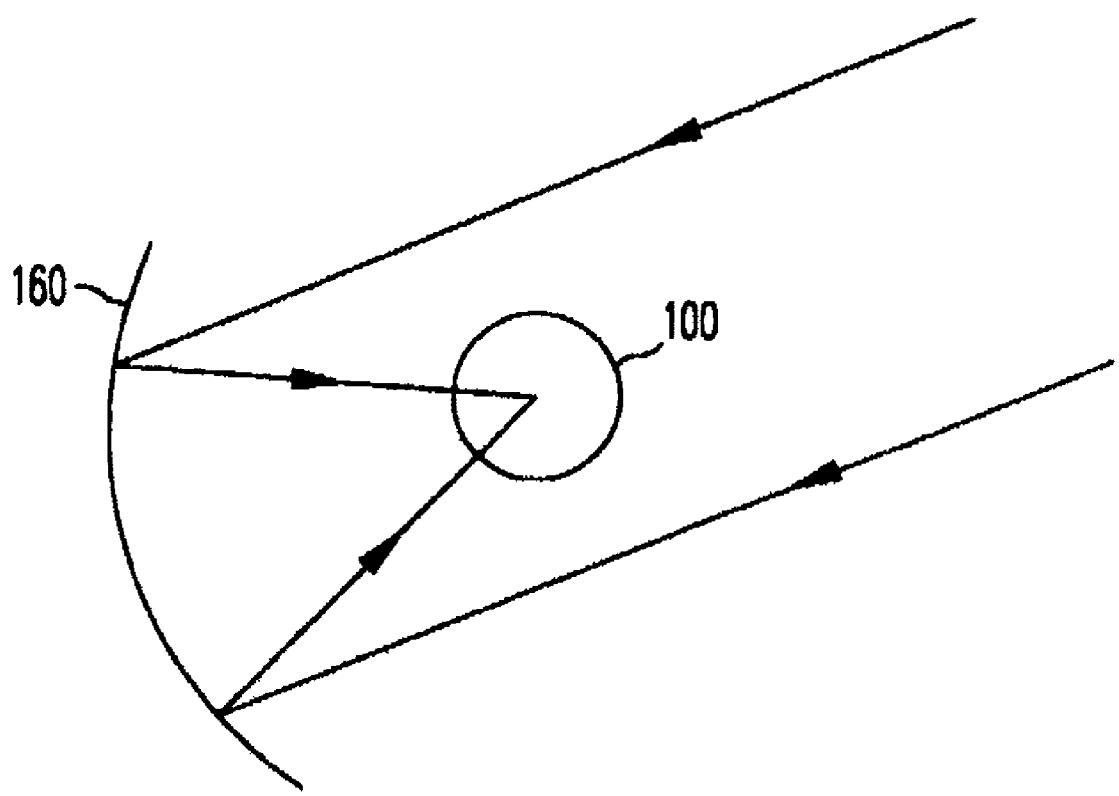
FIG. 1 shows heat engine 100 receiving solar energy from a solar reflector 160, in accordance one embodiment of the present invention.
Figure 2:
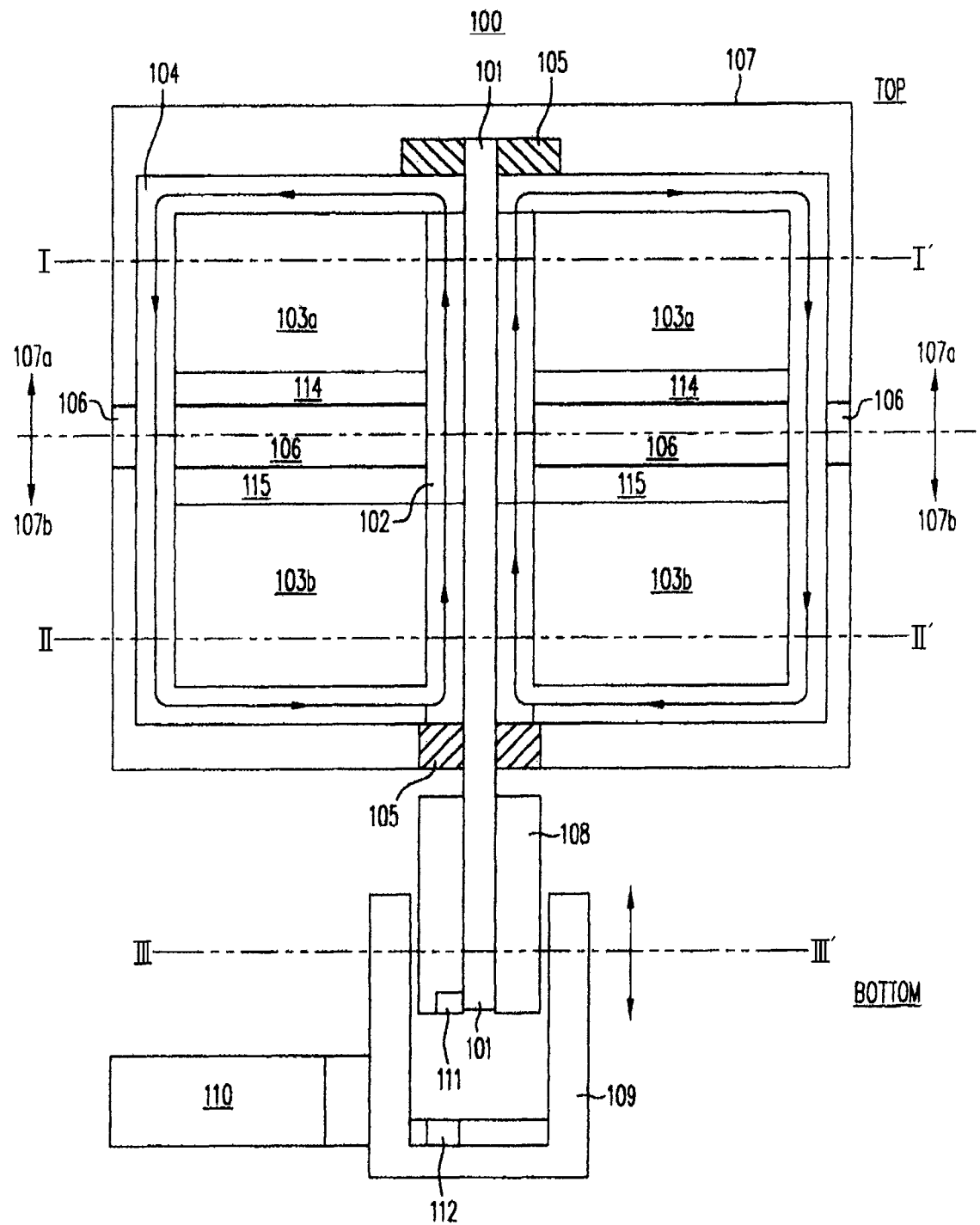
FIG. 2 shows one implementation of heat engine 100 of FIG. 1 in a cross-sectional view.

The heat engine of the present invention may operate with any source of heat energy, including solar, geothermal, fossil, landfill recovered or other fuels. FIG. 1 shows heat engine 100 receiving solar energy from a solar reflector 160, in accordance one embodiment of the present invention. One embodiment of heat engine 100 of FIG. 1 is shown in a cross section view in FIG. 2. As shown in FIG. 2, heat energy 100 includes an external housing 107 which seals a hot portion or zone 107a and a cold portion or zone 107b. In this detailed description, the terms "hot" and "cold" are relative. A heat engine of the present invention will operate as long as there is a sufficient temperature difference between the hot portion and the cold portion. Further, the upper and lower portions of FIG. 2 are labeled "top" and "bottom", respectively, merely to facilitate reference in this detailed description. A heat engine of the present invention is not limited by its position in any orientation.

Hot portion 107a ("hot zone") and cold portion 107b ("cold zone") are insulated from each other by insulating zone 106. Except for insulating zone 106, housing 107 may be metallic (e.g., steel) to allow rapid and even heat distribution. Heat engine 100 includes turbine 103; in the implementation shown in FIG. 2, turbine 103 includes two sets of blades, labeled 103a and 103b, respectively, which are connected by center axle 101. Blade set 103a and blade set 103b are housed within the hot and cold zones, respectively. Blade sets 103a and 103b are preferably made of metal to allow even and rapid heat distribution. In this embodiment, blade sets 103a and 103b are provided on support plates 114 and 115 respectively. The area between support plates 114 and 115 may be considered an open area with support plates 114 and 115 on the top and bottom, or an area enclosed by support plates 114 and 115. Furthermore, support plates 114 and 115 may be provided as an integrally formed structure. Support plates 114 and 115 may act as an insulator (i.e. being made of a thick layer of insulated material or filled with an insulation material).

Figure 3:
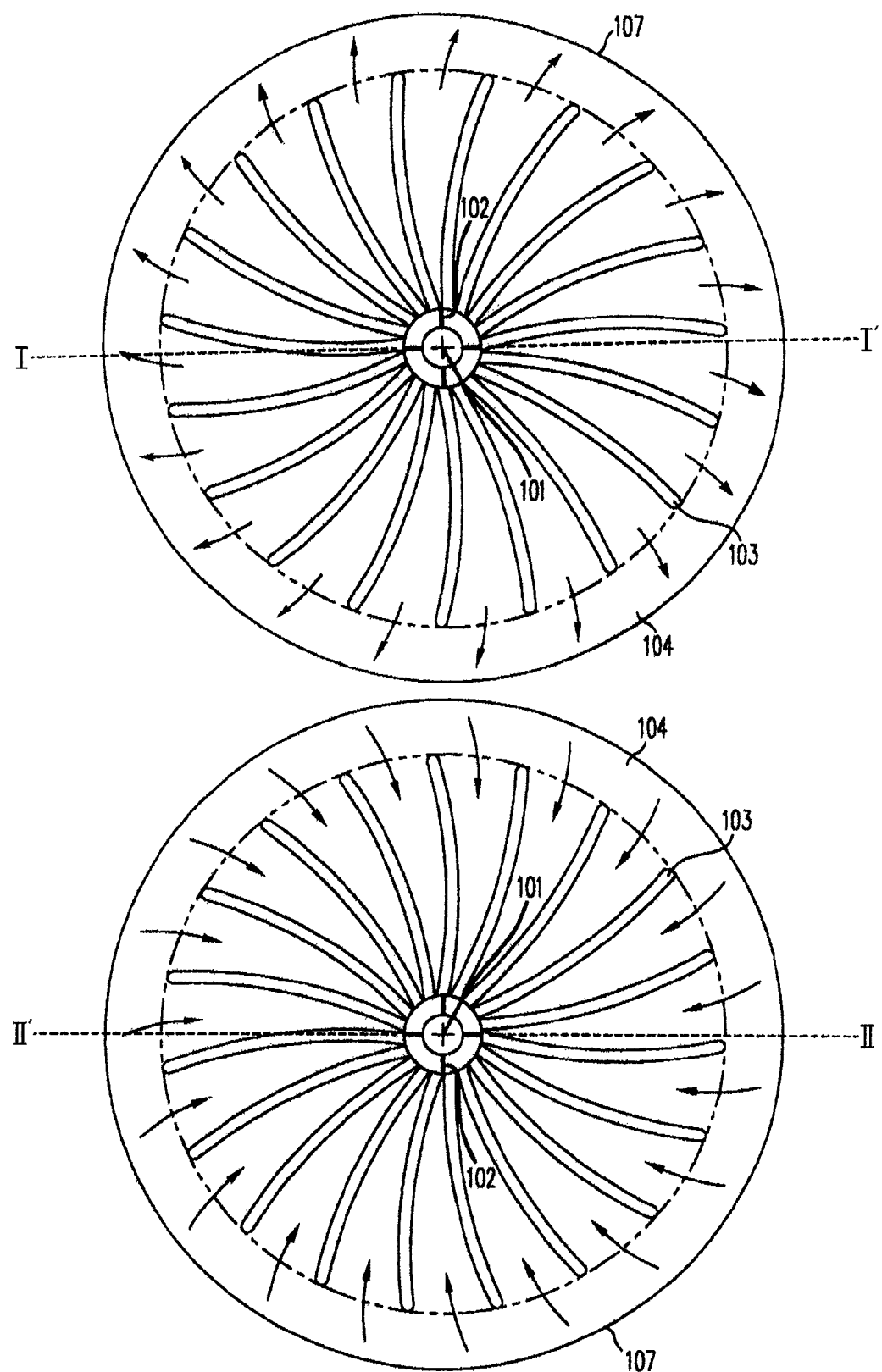
FIG. 3 shows a cross-sectional view of heat engine 100 along line I-I' (top), viewed from top, and a cross-sectional view of heat engine 100 along line II-II' (bottom), viewed from the bottom.

FIG. 3 shows a cross-sectional view of heat engine 100 along line I-I' (top), viewed from top, and a cross-sectional view of heat engine 100 along line II-II' (bottom), viewed from the bottom. Blade sets 103a and 103b are each provided a rounded contour, such that one side of the blade has a larger cross-section than the other, to allow the blades to rotate in a predetermined direction. The difference in surface area is not necessary, but may provide some advantage in some applications, such as ease in starting up. Blade sets 103a and 103b provide large surface areas for heat transfer. Thus, heat engine 100 has a high surface to volume ratio to enhance efficiency.

Figure 4:
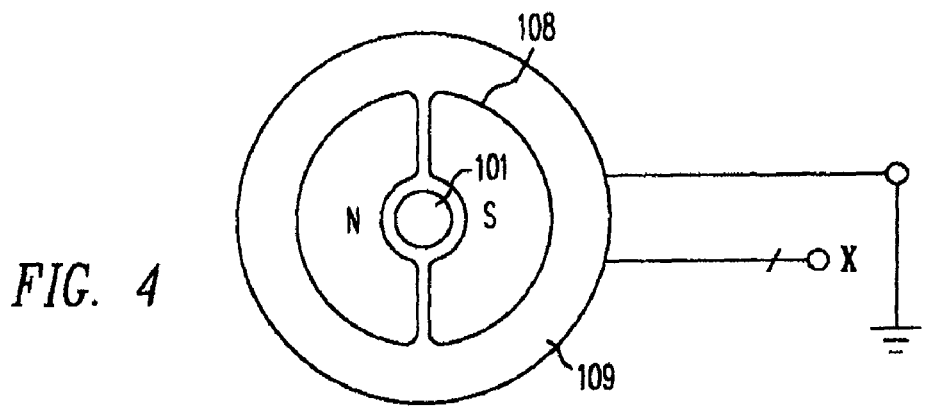
FIG. 4 is a cross section view of heat engine 100 along line III-III', showing center axle 101, magnets 108 and coils 109.

Center axle 101 is unsheathed in air shaft 102 that runs from top to bottom along the entire lengths of hot portion 107a and cold portion 107b of housing 107, connecting the hot and cold chambers. The hot and cold zones are also connected by annular space 104 along the circumference of the outer wall of housing 104. Center axle 102 is held by bearings 105, which allow center axle 101—and thus blade sets 103a and 103b also—to rotate about its center axis. Because the contact points between bearings 105 and center axle 103 are the only locations in heat engine 100 which experience mechanical wear and tear, heat engine 100 has a long service life and a low service requirement and thus easily maintained. A portion of center axle 101 extends outside of housing 107. Cylindrical magnet 108 attaches to and rotates with this portion of center axle 101 which extends outside of housing 107. One or more coils 109 surround magnet 108. Coils 109 may be driven by step motor 110 in an up and down motion to vary the amount of magnet flux coupling the magnetic field of magnet 108. FIG. 4 is a cross sectional view of heat engine 100 along line III-III', showing center axle 101, magnet 108 and coils 109. As shown in FIG. 4, coils 109 may include one or more coils with their respective output terminals (labeled "x") and a common ground terminal. FIG. 2 also shows reflector 111 provided with magnet 108, and a position sensor 112. Position sensor 112 includes a light emitting diode (LED) and a sensor sensitive to light reflected from reflector 111. Each of coils 109 may be provided with a position sensor, so that a control circuit may be able to determine the frequency and the phase of the alternating electrical current induced in the coil by the magnet.

Figure 6:
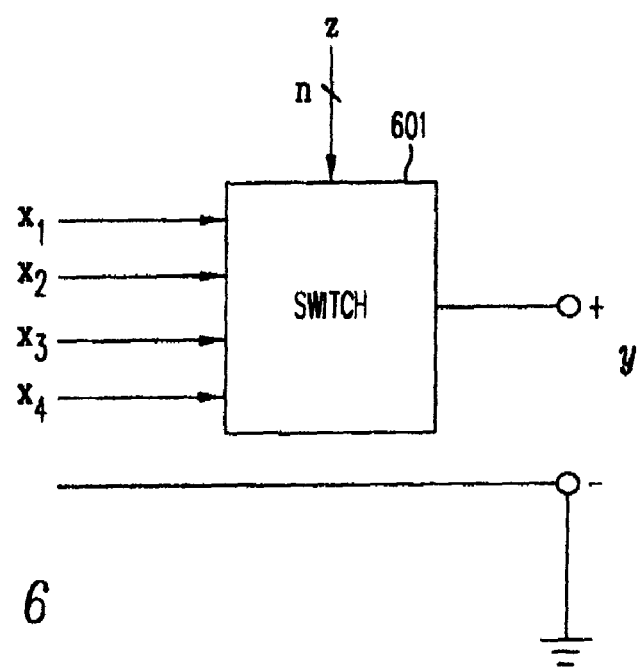
FIG. 6 shows multiplexing switch 601 provided to selectively couple each of terminal x to output terminal y.

In this embodiment, when coils 109 includes more than one coil (as may be desirable for DC power generation), a multiplexing switch 601 may be provided, as shown in FIG. 6, to selectively couple each of terminal x to output terminal y according to the phase of the alternating electrical current in each coil. If only one coil is present in coils 109, the single output terminal x of coils 109 is directly coupled to terminally.

During operation, as heat builds up in hot portion 107a of housing 107, the expanding air in the hot zone rises and pushes against blade set 103a on support plate 114. Thus, turbine 103 begins to rotate about the axis of center axle 101 due to the torque of the expanding air. The expanding air moves radially outward towards the periphery and into the cold zone via annular air space 104. As the expanding air enters into cold zone 107b, the air in cold zone 107b contracts by a cooling mechanism (e.g., the walls of housing 107 in cold zone 107b may include pipes circulating a cooling fluid). The contracting air draws the expanding air into cold zone 107b. As blade set 103b on support plate 115 in cold zone 107b is connected by center axle 101 to rotating blade set 103a on support plate 114, blade set 103b rotates at the same angular speed as blade set 103a, thereby contributing to the torque rotating turbine 103. The cooled air in cold zone 107b is drawn by convection radially towards center axle 101 and is forced into hot zone 107a via air shaft 102. Thus, a circulation of air is established which flows radially outwards in hot zone 107a, enters cold zone 107b via annular airspace 104, flows radially inwards in cold zone 107b and returns to hot zone 107a through air shaft 102. In this process, the relatively hot air from hot zone 107a that expands and flows into cold zone 107b is cooled in cold zone 107b, while the relatively cold air from cold zone 107b is heated in hot zone 107a. As magnet 108 rotates with center axle 101, the result varying magnetic field induces one or more electrical currents in coils 109. This electric current can be used to generate AC or DC electrical power, as discussed in further detail below. A temperature difference between hot zone 107a and cold zone 107b may be established, such that the output power and the heat dissipated from housing 107 equals the input power. Cold zone 107b may be cooled and maintained at a pre-determined temperature by fluid (e.g., air). Such fluid may flow in channels provided in walls of housing 107b, or by other means known to those skilled in the art. Efficiency for the heat transfer may be enhanced by pressurizing the hot and cold zones. Alternatively, rather than using air, other gases may also be used.

Figure 5:
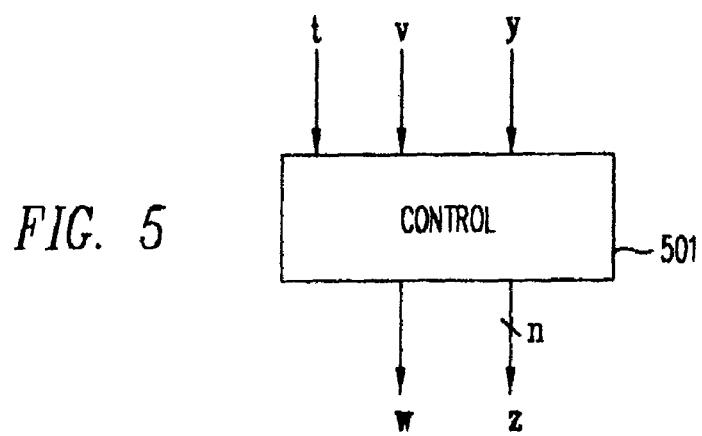
FIG. 5 shows control circuit 501 capable of controlling the output power based on an operating temperature difference.

The operating temperature difference between hot zone 107a and cold zone 107b either by the cooling method discussed above, by controlling the output power, or both. The output power can be controlled by increasing or decreasing the magnetic field coupling between magnet 108 and coils 109 by motor 110 driving coils 109 up or down. A temperature sensor (not shown) sensitive to the temperature difference between hot zone 107a and cold zone 107b may be provided to sense the operating temperature difference. FIG. 5 shows control circuit 501 capable of controlling the output power based on the operating temperature difference. The control scheme may be implemented using digital or analog techniques, as known to those skilled in the art. As shown in FIG. 5, a signal v representing the operating temperature difference is received from the temperature sensor and provided to control circuit 501. Based on the value of signal v, output control signal w drives step motor 110 up or down to vary the magnetic coupling between magnet 108 and coils 109, as appropriate.

For generating AC electrical power, position sensor 112 may be used to detect the rotational frequency of axle 101. Positional sensor 112 asserts a control signal (e.g., control signal t) to control circuit 501 whenever reflector 111 comes into the detection field of positional sensor 112. The time difference between successive assertions of the control signal allows control circuit 501 to determine the frequency of the rotating magnetic field of magnet 108, and thus the frequency of the output AC power.

As mentioned above, for AC power generation, coils 109 need only be a single coil, output terminal y is a single output. Without further processing, the output power is delivered in the form of an AC current flowing between terminal y and the ground terminal, whose frequency is proportional to central axle 101's angular speed of rotation. Because the amount of output power is a load on center axle 101, increasing the amount of magnetic coupling between magnet 108 and coils 109 increases the load on center axle 101, thereby affecting the angular speed of rotation. Accordingly, the output terminal y may be coupled into a high impedance input terminal of control circuit 501, which may be provided a frequency sensing circuit (e.g., a trigger circuit). The detected frequency of the output AC current is used to adjusted through step motor 110, which drives coils 109 up or down according to output control signal w. This control scheme may thus be used to provide an output power from heat engine 110 which is compatible with 50 or 60 Hz household AC power.

In DC power generation, coils 109 may include multiple coils. At any given time, some of terminals x have positive voltages relative to the ground terminal, and others of terminals x have negative voltages relative to the ground terminal. During DC power generation, the position sensor associated with each of coils 109 provides to control circuit 501 control signal t which indicates when the associated reflector comes into the detection field of the position sensor. Once the particular coil of coils 109 is identified as having the desired positive voltage phase, control circuit 501 provides control signals z to switch 601 (FIG. 6) which selectively couples output terminal x of the particular coil to output terminal y. In this manner, DC power generation is accomplished. The signal in output terminal y may be shaped to a constant voltage using, for example, a low-pass filter or a voltage regulator. The heat engine's efficiency, as measurable by axle rotation frequency, for example, determines the efficiency of the DC power generation. The axle rotation frequency can be measured by the time between successive detection signals from a position sensor. The load on the heat engine can be adjusted by varying the magnetic field coupling between the coils and the magnets to maintain a predetermined optimal axle rotation frequency.

Alternatively, the AC output power generated according to discussion above may be rectified to provide a DC power output, using any suitable rectifier circuits known to those skilled in the art.

Additional energy conversion may be accomplished using thermal couples that provide output signals according to the temperature difference between hot zone 107a and cold zone 107b. Alternatively, the walls of housing 107 at hot zone 107a may be used to generate power using thermionic principles. The thermal couples or thermionic components can be housed insulating zone 106 of FIG. 1, for example.

The above detailed description is provided to illustrate the specific embodiments of the present invention and is not intended to be limiting. Numerous modifications and variations with in the scope of the present invention are possible. The present invention is set forth in the following claims.

We claim:

1. An apparatus for power generation, comprising:
    a housing enclosing a chamber filled with a fluid, the chamber receiving heat energy from a power source;
    a first zone in the chamber coupled to receive the heat energy;
    a second zone in the chamber dissipating heat away from the chamber, such that during operation a temperature difference is created between the first zone and the second zone; and
    a rotor that produces output power, the rotor having a portion in the chamber which is put into non-oscillating motion by fluid expansion, fluid contraction or fluid motion;
    wherein the portion includes a first blade having a section outside the second zone that creates torque and a second blade separated from the first blade such that the fluid flows on the portion within at least two different channels as the fluid moves into the first zone, through the first zone, out of the first zone to the second zone, into the second zone and through the second zone, wherein the portion has a rotational speed close to that of the fluid as the fluid moves from the first zone into the second zone, wherein the fluid maintains the same phase between the first zone and the second zone, wherein the fluid creates a force that acts on the portion of the rotor for at least a time period that overlaps with fluid movement between the second zone and the first zone, and wherein the rotor potion closest to or within the first zone and at least a portion of the fluid within the first zone rotate in the same direction.

2. An apparatus as in claim 1, wherein the rotor includes an axle driven by the rotational motion.

3. An apparatus as in claim 1, wherein the fluid flows outward in the first zone and inward in the second zone.

4. An apparatus as in claim 1, wherein the portion has a first set of blades.

5. An apparatus as in claim 1, further comprising a support plate located between the first zone and the second zone.

6. An apparatus as in claim 1, wherein heat dissipation from the second zone is accomplished by circulating a second fluid.

7. An apparatus as in claim 1, wherein the fluid flows between the first zone and the second zone through a first space and a second space between the first zone and the second zone.

8. An apparatus as in claim 1, where in the fluid is pressurized.

9. An apparatus as in claim 4, wherein the first set of blades has a first blade having a first surface and a second surface, the first surface and the second surface of the first blade having unequal surface areas.

10. A method for power generation, comprising:
    enclosing a fluid in a chamber within a housing which receives heat energy from a power source;
    coupling the heat energy to a first zone in the chamber;
    a second zone in the chamber dissipating heat away from the chamber, such that a temperature difference is created between the first zone and the second zone; and providing a rotor that produce output power, the rotor having a portion in the chamber which is put into non-oscillating motion by fluid expansion, contraction or fluid motion wherein the fluid maintains the same phase between the first zone and the second zone, and wherein the portion includes a first blade having a section outside the second zone that creates torque and a second blade separated from the first blade such that the fluid flows on the portion within at least two different channels as the fluid moves into the first zone, through the first zone, out of the first zone to the second zone, into the second zone and through the second zone, wherein the portion has a rotational speed close to that of the fluid as the fluid moves from the first zone into the second zone, wherein the fluid creates a force that acts on the portion of the rotor for at least a time period that overlaps with fluid movement between the second zone and the first zone, and wherein the rotor potion closest to or within the first zone and a fluid rotation within the first zone rotate in the same direction.

11. A method as in claim 10, further comprising including in the rotor an axle driven by the rotational motion.

12. A method as in claim 10, wherein the portion has a first set of blades.

13. A method as in claim 10, further comprising a support plate located between the first zone and the second zone.

14. A method as in claim 10, wherein heat dissipation from the second zone is accomplished by circulating a second fluid.

15. A method as in claim 10, further comprising providing a first space and a second space between the first zone and the second zone so as to allow fluid to move between the first zone and the second zone.

16. A method as in claim 10, where in the fluid is pressurized.

17. A method as in claim 12, wherein the first set of blades has a first blade having a first surface and a second surface, the first surface and the second surface of the first blade having unequal surface areas.

18. An apparatus as in claim 1, wherein the portion has a second set of blades.

19. An apparatus as in claim 18, wherein the second set of blades moves the fluid toward a member of the portion.

20. A method as in claim 10, wherein the portion is provided a second set of blades.

21. A method as in claim 20, wherein providing the second set of blades to move the fluid toward a member of the portion.

22. An apparatus as in claim 5, further comprising a thermal insulation zone.

23. An apparatus as in claim 5, further comprising a thermal-electric device.

24. An apparatus as in claim 1, wherein the fluid moves in an open space between the first zone and the second zone within said housing.

25. An apparatus as in claim 1, wherein the fluid circulates over a non-linear path.

26. An apparatus as in claim 1, wherein the fluid moves in a plurality of paths between the first zone and the second zone.

27. An apparatus as in claim 18, wherein the motion of the portion provides an evenly distributed torque on the axle.

28. A method as in claim 13, further providing a thermal insulation zone.

29. A method as in claim 13, further providing a thermal-electric device for electricity generation.

30. A method as in claim 10, wherein moving the fluid over a radial path between the first zone and the second zone.

31. A method as in claim 10, wherein moving the fluid between the first zone and the second zone over a non-linear path.

32. A method as in claim 10, wherein the fluid moves over a plurality of paths between the first zone and the second zone within said housing.

33. A method as in claim 10, wherein the motion of the portion provides an evenly distributed torque on the axle.

34. A method of providing working fluid circulation path through space within an enclosed chamber of a heat engine, the method comprising:
providing a turbine within the chamber;
partitioning the chamber into to a first zone and a second zone;
filling the chamber, including the first zone and the second zone, with the working fluid;
heating said first zone with the heat from a heat source;
cooling said second zone using said heat sink to dissipate the heat; and
wherein the working fluid maintains the same phase between the first zone and the second zone, wherein the turbine includes a first blade having a section outside the second zone that creates torque and a second blade separated from the first blade such that the fluid flows on the turbine within at least two different channels as the fluid moves into the first zone, through the first zone, out of the first zone to the second zone, into the second zone and through the second zone, wherein the turbine has a rotational speed close to that of the fluid as the fluid moves from the first zone into the second zone, wherein the working fluid creates a force that acts on the turbine for at least a time period that overlaps with fluid movement between the second zone and the first zone, and wherein the turbine potion closest to or within the first zone and a fluid rotation within the first zone rotate in the same direction.

35. A method for mechanical power generation using a heat engine with an enclosed chamber, the method comprising:
partitioning the chamber into a first zone and a second zone, the first zone further adapted from receiving heat from a heat source, and the second zone being further adapted for transferring heat into a heat sink;
providing a rotor having a first set of blades and coupled to drive an axle;
providing a working fluid in the first and second zones, wherein when heat is received from the heat source, the working fluid expands and urges the first set of blades, resulting in a rotational motion in the rotor, thereby providing power to drive the axle;
wherein the working fluid maintains the same phase between the first zone and the second zone, wherein the first set of blades includes a first blade having a section outside the second zone that creates torque and a second blade separated from the first blade such that the fluid flows on the rotor within at least two different channels as the fluid moves into the first zone, through the first zone, out of the first zone to the second zone, into the second zone and through the second zone, wherein the rotor has a rotational speed close to that of the fluid as the fluid moves from the first zone into the second zone, wherein the fluid creates a force that acts on the set of blades for at least a time period that overlaps with fluid movement between the second zone and the first zone, and wherein the rotor potion closest to or within the first zone and a fluid rotation within the first zone rotate in the same direction.

36. A method as in claim 35, the method further comprising a second set of blades in the second zone, wherein when the working fluid urges the second set of blades to result in rotational motion in the second set of blades.

37. A method for generating mechanical power using a heat engine having a sealed housing enclosing a chamber filled with a fluid, the method comprising:
- providing a rotatable support plate connected to an axle, thereby partitioning the chamber into a heat source zone and a heat sink zone; and
- providing a first set of blades on the support plate in said heat source zone, wherein the first set of blades are shaped such that expansion of the fluid in the heat source zone applies a force on the first set of blades, resulting in the torque for rotating the axle in a predetermined direction;
- wherein the fluid maintains the same phase between the heat source zone and the heat sink zone, wherein the first set of blades includes a first blade having a section outside the heat sink zone that creates torque and a second blade separated from the first blade such that the fluid flows through the blades within at least two different channels as the fluid moves into the heat source zone, through the heat source zone, out of the heat source zone to the heat sink zone, into the heat sink zone and through the heat sink zone, wherein the set of blades have a rotational speed close to that of the fluid as the fluid moves from the heat source zone into the heat sink zone, and wherein the axle potion closest to or within the heat source zone and a fluid rotation within the heat source zone rotate in the same direction.

38. A method as in claim 37, further comprising providing a second set of blades in the heat sink zone, wherein the second set of blades are shaped such that motion of the fluid in the heat sink zone applies a force on the second set of blades, contributing to the torque for rotating the axle.

39. A method as in claim 37, further comprising providing a thermal insulation zone between the heat source zone and the heat sink zone.

40. A method of operating a heat engine having an enclosed chamber configured as a set of blades that move in a non-oscillating motion, a working fluid, a working fluid space, a heat source and a heat sink separated from the heat source, the method comprising:
- providing in said chamber a hot zone with a higher temperature due to heat from said heat source and a cold zone with a lower temperature due to heat conducting away by said heat sink;
- providing a first blade having a section outside the cold zone that creates torque and a second blade within the set of blades separated from the first blade such that the working fluid flows through the set of blades within at least two different channels as the working fluid moves into the hot zone, through the hot zone, out of the hot zone to the cold zone, into the cold zone and through the cold zone;
- circulating the working fluid between the hot zone and the cold zone through the working fluid space such that the working fluid maintains its phase moving from the cold zone to the hot zone and from the hot zone to the cold zone; and
- using the motion of the working fluid to turn the set of blades in non-oscillating motion so as to provide mechanical power, wherein the set of blades have a rotational speed close to that of the fluid as the working fluid moves from the hot zone into the cold zone, wherein the set of blades closest to or within the hot zone and a working fluid rotation within the hot zone rotate in the same direction and wherein the working fluid creates a force that acts on the set of blades for at least a time period that overlaps with working fluid movement between the cold zone and the hot zone.

41. A method of operating a heat engine having an enclosed chamber configured as a set of blades that move in a non-oscillating motion, a working fluid, a working fluid space, a heat source zone and a heat sink zone, the heat source zone having a higher temperature than the temperature of the heat sink zone, the method comprising:
- providing a first blade having a section outside the cold zone that creates torque and a second blade within the set of blades separated from the first blade such that the working fluid flows through the set of blades within at least two different channels as the working fluid moves into the heat source zone, through the heat source zone, out of the heat source zone to the heat sink zone, into the heat sink zone and through the heat sink zone;
- providing a plurality of paths in the working fluid space for movement of the working fluid between said heat source zone and said heat sink zone such that the working fluid maintains its phase within the fluid paths; and
- using the motions of the working fluid in the fluid paths to rotate the set of blades in a non-oscillating motion, so as to produce mechanical power, wherein the set of blades have a rotational speed close to that of the working fluid as the working fluid moves from the heat source zone into the heat sink zone, wherein the set of blades closest to or within the heat source zone and a working fluid rotation within the heat source zone rotate in the same direction and wherein the working fluid creates a force that acts on the set of blades for at least a time period that overlaps with fluid movement between the heat sink zone and the heat source zone.

42. A method for operating a heat engine exposed to a heat source, the heat engine having an enclosed chamber configured with a set of blades that move in a non-oscillating motion, a working fluid, a working fluid space, a first zone and a second zone, the first zone having a higher temperature than the second zone, the method comprising:
- moving the working fluid into a first portion of the working fluid space, the first portion being a space in which the working fluid flows;
- moving the working fluid in the first portion of the working fluid space into the second zone;
- moving the working fluid in the second zone into a second portion of the working fluid space;
- moving the working fluid in the second portion of the working fluid space into the first zone;
- maintaining the working fluid in the same phase as the working fluid flows through the first portion and the second portion; and
- providing a first blade having a section outside the second zone that creates torque and a second blade within the set of blades separated from the first blade such that the working fluid flows through the set of blades within at least two different channels as the working fluid moves into the first zone, through the first zone, out of the first zone to the second zone, into the second zone and through the second zone, wherein the set of blades have a rotational speed close to that of the working fluid as the working fluid moves from the first zone into the second zone, wherein the set of blades closest to or within the first zone and a fluid rotation within the first zone rotate in the same direction and wherein the working fluid creates a force that acts on the set of blades for at least a time period that overlaps with fluid movement between the second zone and the first zone.

43. A structure for operating a heat engine, wherein the heat engine comprises a housing enclosing a chamber having a working fluid, a set of blades configured for non-oscillatory motion, a first zone and a second zone, with the second zone having a temperature higher than a temperature of the first zone during operation of the heat engine, the structure comprising a space that allows the working fluid to move between the first zone and second zone in a first portion of the space in a first direction and in an outer space outside the structure in a second direction, wherein the working fluid maintains its phase moving through the first portion and the second portion, wherein the working fluid creates a force that acts on the set of blades for at least a time period that overlaps with fluid movement between the first zone and the second zone, wherein the set of blades closest to or within the second zone and a working fluid rotation within the second zone rotate in the same direction, wherein the set of blades have a rotational speed close to that of the working fluid as the working fluid moves from the second zone into the first zone, and wherein the set of blades includes a first blade having a section outside the first zone that creates torque and a second blade separated from the first blade such that the fluid flows on the portion in at least two different channels as the working fluid moves into the second zone, through the second zone, of the second zone to the first zone, into the first zone and through the first zone.

44. A structure as in claim 43, wherein one of the openings of the first portion of the space and the outer space is circular.

45. A structure as in claim 43, wherein the outer space surrounds the first portion of the space.

46. A plurality of fluid flow paths for operating a heat engine, wherein the heat engine comprises a housing, a chamber enclosed by the housing having a working fluid, a set of blades configured for non-oscillatory motion, a first zone and a second zone, the second zone having a temperature higher than a temperature of the first zone during operation of the heat engine, wherein the set of blades includes a first blade having a section outside the first zone that creates torque and a second blade separated from the first blade such that the working fluid flows through the set of blades within at least two different channels as the fluid moves into the second zone, through the second zone, out of the second zone to the first zone, into the first zone and through the first zone, wherein the set of blades have a rotational speed close to that of the working fluid as the working fluid moves from the second zone into the first zone, wherein a first path and a second path allow the working fluid to move between the first zone and the second zone, wherein the set of blades closest to or within the second zone and a working fluid rotation within the second zone rotate in the same direction, wherein the first path or the second path provides non-intermittent flows, wherein the working fluid maintains its phase within the first path and the second path, wherein the fluid creates a force that acts on the set of blades for at least a time period that overlaps with fluid movement between the first zone and the second zone, and wherein and the second path is located interior to the chamber and the first path.

47. A plurality of fluid flow paths as in claim 46, wherein one of the first and second paths flow over a cylindrical space.

48. A plurality of fluid flow paths as in claim 46, wherein one of the first and second paths flow over an annular space.

49. A heat engine, comprising:
a housing enclosing a chamber filled with a working fluid;
a first zone within the chamber;
a second zone within the chamber, the second zone having a higher temperature than a temperature in the first zone during operation; and
a set of blades configured for non-oscillating motion, the set of blades being set into motion by the working fluid, wherein the set of blades, while moving, propels the working fluid in a preferred direction, which maintains the same phase between the first zone and the second zone, wherein the set of blades includes a first blade having a section outside the first zone that creates torque and a second blade separated from the first blade such that the working fluid flows through the set of blades within at least two different channels as the fluid moves into the second zone, through the second zone, out of the second zone to the first zone, into the first zone and through the first zone, wherein the set of blades have a rotational speed close to that of the working fluid as the working fluid moves from the second zone into the first zone, wherein the set of blades closest to or within the second zone and a fluid rotation within the second zone rotate in the same direction and wherein the fluid creates a force that acts on the portion of the rotor for at least a time period that overlaps with fluid movement between the first zone and the second zone.

50. An apparatus as in claim 2, wherein the axle has a section within the housing which passes through both the first zone and the second zone.

51. An apparatus as in claim 4, wherein the first set of blades is located in the first zone.

52. An apparatus as in claim 4, wherein the first set of blades is located in the second zone.

53. An apparatus as in claim 4, wherein the first set of blades is located between the first zone and the second zone.

54. An apparatus as in claim 4, wherein the first set of blades creates a torque on the fluid.

55. An apparatus as in claim 4, wherein the first set of blades moves fluid to a useful direction.

56. An apparatus as in claim 4, wherein the first set of blades accelerates fluid motion.

57. An apparatus as in claim 4, wherein the first set of blades provides surface areas for heating the fluid or dissipating heat from the fluid.

58. An apparatus as in claim 5, further comprising space to allow the fluid to move between the first zone and the second zone.

59. An apparatus as in claim 1, wherein the fluid rotates about an axis of rotation.

60. An apparatus as in claim 1, wherein the fluid flow is continuous.

61. An apparatus as in claim 1, wherein the portion in the housing puts the fluid into a rotational motion.

62. An apparatus as in claim 1, wherein the portion in the housing and the fluid rotate in a preferred direction.

63. An apparatus as in claim 1, wherein the velocity of the fluid and the velocity of the portion is substantially same.

64. An apparatus as in claim 9, wherein the first blade of the first set of blades has a surface parallel to fluid flow direction.

65. A method as in claim 11, further providing the axle having a section within the housing goes through the first zone and the second zone.

66. A method as in claim 12, wherein the first set of blades is provided in the first zone.

67. A method as in claim 12, wherein the first set of blades is provided in the second zone.

68. A method as in claim 12, wherein the first set of blades is provided between the first zone and the second zone.

69. A method as in claim 12, wherein the first set of blades creates torque on the fluid.

70. A method as in claim 12, wherein the first set of blades moves the fluid in a useful direction.

71. A method as in claim 12, wherein the first set of blades accelerate fluid motion.

72. A method as in claim 12, wherein the first set of blades provides surface areas for heating the fluid or dissipating heat away from the fluid.

73. A method as in claim 13, further comprising providing space to allow the fluid to move between the first zone and the second zone.

74. A method as in claim 10, wherein the fluid rotates about an axis of rotation.

75. A method as in claim 10, wherein providing the fluid flow is continuous.

76. A method as in claim 10, wherein providing the portion puts the fluid into a rotational motion.

77. A method as in claim 10, wherein providing the portion and the fluid rotate in a preferred direction.

78. A method as in claim 10, wherein the velocity of the fluid and the velocity of the portion is substantially the same.

79. A method as in claim 17, wherein the first blade of the first set of blades has a surface parallel to fluid flow direction.

80. An apparatus as in claim 24, wherein the open space reduces loss of velocity in the fluid.

81. An apparatus as in claim 24, wherein the open space comprises a first portion and a second portion.

82. An apparatus as in claim 81, wherein the first portion of the open space is surrounded by the second portion of the open space.

83. An apparatus as in claim 82, further comprising a fluid path along the first zone, the first portion of the open space, the second zone, and the second portion of the open space, and back to the first zone.

84. An apparatus as in claim 1, further comprising a first path and a second path that allow the fluid to move between the first zone and the second zone.

85. An apparatus as in claim 84, wherein surrounding the first path by the second path.

86. A method as in claim 10, wherein the fluid moves in an open space between the first zone and the second zone within said housing.

87. A method as in claim 86, wherein the open space reduces velocity loss in the fluid.

88. A method as in claim 86, wherein the open space has a first portion and a second portion.

89. A method as in claim 88, wherein the first portion of the open space is surrounded by the second portion of the open space.

90. A method as in claim 89, further comprising a fluid path along the first zone, the first portion of the open space, the second zone, the second portion of the open space, and back to the first zone.

91. A method as in claim 10, further comprising a first path and a second path allowing the fluid to move between the first zone and the second zone.

92. A method as in claim 91, wherein the first path is surrounded by the second path.

93. An apparatus for power generation, comprising:
a housing having a chamber enclosing a fluid;
an axle having a portion within the chamber which produces output power;
a hot zone in the housing coupled to receive heat energy; and
a cold zone in the housing dissipating heat away from the housing, such that, during operation, a temperature difference is created between the cold zone and the hot zone and portions of the fluid flow within the hot zone and cold zone rotate around an axis in the same direction as the axle, wherein the portion has a rotational speed close to that of the fluid as the fluid moves from the hot zone into the cold zone, and wherein the portion includes a first blade having a section outside the cold zone that creates torque and a second blade separated from the first blade such that the fluid flows on the portion within at least two different channels as the fluid moves into the hot zone, through the hot zone, out of the hot zone to the cold zone, into the cold zone and through the cold zone.

94. An apparatus for power generation as in claim 93, further comprising a set of blades which accelerate fluid motion.

95. An apparatus for power generation as in claim 93, further comprising a set of blades which creates a centrifugal force to work on the fluid.

96. An apparatus for power generation as in claim 93, wherein the fluid is compressed in the hot zone, thereby creating a fluid pressure in the hot zone.

97. An apparatus for power generation as in claim 93, further comprising a set of blades that create a radial fluid flow which rotates the set of blades.

98. An apparatus for power generation as in claim 93, further comprising a plurality of sets of blades that are set into rotational motion by the fluid flow and wherein the plurality of sets of blades are located in different zones.

99. An apparatus for power generation as in claim 93, wherein an angular momentum of the fluid moves the fluid.

100. An apparatus for power generation as in claim 93, further comprising a set of blades in the cold zone wherein the fluid flow in the cold zone causes the set of blades to rotate.

101. An apparatus for power generation as in claim 93, wherein the fluid flow is continuous.

102. An apparatus for power generation as in claim 93, wherein the fluid flows in paths resulting from a convergent portion of fluid angular momentum and a divergent portion of fluid angular momentum.

103. An apparatus for power generation as in claim 93, further comprising a set of blades, the fluid and the set of blades rotating in the same direction.

104. An apparatus for power generation as in claim 93, further comprising a rotor put into motion by the fluid acting on more than one portion of the rotor.

105. An apparatus for power generation as in claim 93, further comprising a set of blades moving as a unit.

106. An apparatus for power generation, comprising:
a housing including a chamber enclosing a fluid;
an axle having a portion within the chamber which produces output power;
a hot zone in the housing coupled to receive heat energy; and
a cold zone in the housing dissipating heat away from the housing such that, during operation, a temperature difference is created between the cold zone and the hot zone, wherein the portion includes a first blade having a section outside the cold zone that creates torque and a second blade separated from the first blade such that the fluid flows on the portion within at least two different channels as the fluid moves into the hot zone, through the hot zone, out of the hot zone to the cold zone, into the cold zone and through the cold zone, wherein the portion has a rotational speed close to that of the fluid as the fluid moves from the hot zone into the cold zone and wherein fluid expansion moves the fluid outward.

107. An apparatus for power generation as in claim 106, further comprising a set of blades in the hot zone, wherein the fluid flow puts the set of blades into motion or causes the set of blades to compress the fluid.

108. An apparatus for power generation as in claim 106, further comprising a set of blades in the cold zone wherein the fluid flow puts the set of blades into motion.

109. An apparatus for power generation as in claim 106, further comprising a set of blades of an aerodynamic, an impulse or a reactive type.

110. An apparatus for power generation as in claim 106, wherein fluid flow rotates around an axis.

111. An apparatus for power generation as in claim 106, further comprising a set of blades, the set of blades creates a fluid angular momentum that moves the fluid.

112. An apparatus for power generation as in claim 106, further comprising a set of blades such that the radial fluid flow puts the set of blades into motion.

113. An apparatus for power generation as in claim 106, further comprising a set of blades, wherein the fluid flow puts the set of blades into motion and wherein the set of blade's motion moves the fluid.

114. An apparatus for power generation as in claim 106, further comprising a set of blades such that the fluid motion causes the set of blades to rotate.

115. An apparatus for power generation as in claim 106, further comprising a set of blades, wherein the fluid acts on more than one section of the set of blades.

116. An apparatus for power generation as in claim 106, wherein the fluid has a continuous flow.

117. An apparatus for power generation as in claim 106, further comprising a set of blades which rotation increases fluid motion.

118. An apparatus for power generation, comprising:

a housing enclosing a chamber filled with a fluid;

a hot zone in the chamber coupled to receive heat energy;

a cold zone in the chamber dissipating heat away from the chamber, such that during operation a temperature difference is created between the cold zone and the hot zone; and a rotor having a first set of blades in the chamber which is put into rotational motion by fluid expansion, contraction or fluid motion, wherein the first set of blades includes a first blade having a section outside the cold zone that creates torque and a second blade separated from the first blade such that the fluid flows on the portion within at least two different channels as the fluid moves into the hot zone, through the hot zone, out of the hot zone to the cold zone, into the cold zone and through the cold zone, wherein the rotor has a rotational speed close to that of the fluid as the fluid move from the hot zone into the cold zone, and wherein the rotational motion of the first set of blades causes the fluid to rotate around an axis in the same direction as the rotor.

* * * * *